UNITED STATES PATENT OFFICE.

HARRY A. HOFFMAN AND WALTER H. JUVE, OF AKRON, OHIO, ASSIGNORS TO THE B. F. GOODRICH COMPANY, OF NEW YORK, N. Y., A CORPORATION OF NEW YORK.

ART OF MIXING RUBBER WITH COMMINUTED METAL.

1,395,413.     Specification of Letters Patent.     Patented Nov. 1, 1921.

No Drawing.     Application filed March 31, 1920. Serial No. 370,256.

*To all whom it may concern:*

Be it known that we, HARRY A. HOFFMAN and WALTER H. JUVE, citizens of the United States, residing at Akron, in the county of Summit and State of Ohio, have invented a certain new and useful Art of Mixing Rubber with Comminuted Metal, of which the following is a specification.

This invention relates to the art of mixing finely-divided metals, such as lead, aluminum, tin, zinc, etc. into plastic substances such as raw rubber compounds. In vulcanization, the petrolatum is absorbed in the rubber, probably forming what may be termed a solid solution of the two materials, and the metal particles are isolated in the final product by the vulcanized rubber which may contain, around each particle, a substantial quantity of the petrolatum, the degree of isolation depending upon the relative amount of metal present in the mixture, and the ratio of petrolatum to rubber being of course greatest immediately adjacent to the metal particles. Considerable difficulty has heretofore been experienced from the tendency of the metal particles to mass together and unite in lumps or sheets of the metal when mixed with the rubber by a dry milling operation on a roller mill or other form of rubber masticator. The rubber, when vulcanized, has been found to be weakened, and uniformity of its physical properties prevented by the unequal distribution and coalescing of the metal particles. In the manufacture of golf balls, for example, where comminuted metallic lead is mixed with one or more of the rubber elements of the ball to increase the weight of the latter, it has been found that the lead particles have united in flakes, weakening the rubber and impairing its flexibility, the stiff flakes of metal in some instances breaking out through the surface of the sheet of rubber when the latter is formed in place in building up the ball.

Our invention has for its objects to preserve the original degree of fineness of the metal particles, prevent their massing together in cakes, flakes or sheets in the milling operation and secure their more uniform distribution throughout the mass of rubber.

We accomplish these objects by coating the individual metal particles with a thin film of a lubricant which will cling to the particles and keep them separated during the mixing operation. A suitable coating lubricant is petrolatum. The coating may be accomplished by dissolving a relatively small amount of petrolatum or the like in a volatile solvent, such as benzol or gasolene, and treating the finely-divided metal with this solution. The solvent is then removed by evaporation. When the solvent has been removed, the petrolatum remains in the form of a thin film on the individual metal particles and keeps them separated throughout the mixing operation.

We have obtained good results by treating 104 pounds of 350 mesh lead with a solution comprising 2¾ pounds of petrolatum dissolved in a half-gallon of benzol. This mixture is thoroughly stirred and the excess benzol evaporated in a shallow vessel. The final trace of benzol is removed with a vacuum drier, and the material is then ready for compounding with the rubber by the usual milling methods.

We do not wholly limit ourselves to the materials and mode of procedure above set forth.

We claim:

1. The method of physically combining comminuted metal with gum plastics which comprises coating the metal particles with a lubricant and milling them into the plastic.

2. The method of mixing finely-divided metal with rubber which comprises coating the metal particles with a thin film of petrolatum, and milling them into the rubber.

3. The method of mixing rubber with comminuted lead which comprises coating the lead particles with an oleaginous material, and working them into the rubber by mastication.

4. The method of preparing comminuted metal for mixing with a plastic material which comprises mixing the particles with a lubricant dissolved in a solvent, and evaporating the solvent.

5. The method of mixing rubber with comminuted lead which comprises mixing the lead particles with a solution of petrolatum, evaporating the solvent, and milling the coated particles into the rubber.

6. A composition of matter comprising finely-divided lead coated with petrolatum.

7. A composition of matter comprising vulcanized rubber through which is distributed finely-divided metal whose particles are isolated by the rubber, said rubber containing an oleaginous lubricant adjacent the particles.

8. A composition of matter comprising vulcanized rubber through which is distributed finely-divided lead whose individual particles are immediately surrounded by rubber containing petrolatum.

In witness whereof we have hereunto set our hands this 25th day of March, 1920.

HARRY A. HOFFMAN.
WALTER H. JUVE.